INVENTOR.
Joseph D. Ryan
BY Nobbe & Swope
ATTORNEYS

United States Patent Office 3,027,608
Patented Apr. 3, 1962

3,027,608
MULTIPLE GLASS SHEET GLAZING UNITS
Joseph D. Ryan, Toledo, Ohio, assignor to Libbey-Owens-Ford Glass Company, Toledo, Ohio, a corporation of Ohio
Filed June 22, 1959, Ser. No. 821,791
6 Claims. (Cl. 20—56.5)

The present invention relates to improvements in multiple glass sheet glazing units.

The general type of glazing unit with which this invention is concerned comprises spaced sheets of glass which are hermetically sealed together around the edges thereof to form a dead-air space or chamber therebetween which may be filled with dehydrated air or other gas, or exhausted to provide a partial vacuum. Such multiple sheet glazing units are well known and have been widely used to reduce heat transfer and to prevent condensation of moisture upon the glass in glazed openings.

However, the efficiency and success of this type of glazing unit is dependent largely upon maintaining the space between the two sheets of glass hermetically sealed since should this seal be broken, or even the slightest leak develop, thereby permitting atmospheric air to enter, the insulating value of the unit will be materially reduced. Despite the care with which the glazing units are handled during the fabrication thereof, it has been found practically impossible to anticipate potential damage that may be incurred during shipment, storage or even during installation of the units. In order to protect the glazing units from accidental damage, a substantially rigid metal frame has been provided around the edges of the unit. Such a frame, as herein disclosed, has to a large extent overcome the above-described problems but, being of a relative hard material, has itself, in some instances, been the cause of failure of the unit. Thus, an impacting force, however slight, which causes the frame to strike the edges of the glass sheets may create very minute, inwardly directed fissures or cracks in the glass. Over a period of time, these fissures or cracks may become extended or enlarged to a point at which the hermetic seal of the glazing unit is broken and leakage occurs to form condensation upon the inner surfaces of the glass sheets.

It is therefore an aim of this invention to provide, in a multiple glass sheet glazing unit including at least two sheets of glass maintained in spaced parallel relationship by separator means positioned therebetween and a protective frame fitted about the edges of the unit, a novel support member arranged between the edges of the glass sheets and the protective frame to establish a cushioning layer therebetween for protecting the edges of the glass sheets from accidental shocks and strains incurred during handling, shipping and installation.

Another object of the invention is to provide, in a multiple sheet glazing unit wherein at least two sheets of glass are maintained in spaced face-to-face relationship by a separator means positioned between the glass sheets adjacent to but inwardly of the peripheral edges thereof to provide a channel surrounding the unit, a novel support member opposite the peripheral edges of the glass sheets and enclosing said channel and having incorporated therein means received in said channel for absorbing any pressure built up by the freezing of moisture therein.

A further object of the invention is to provide, in a multiple sheet glazing unit of the above character, a novel support member comprising a strip of resilient material having portions covering the peripheral edges of the glass sheets between said edges and the protective frame and having formed integral therewith one or more hollow tubular portions, containing air, which are received in the channel between the marginal portions of the glass sheets outwardly of the separator means.

Other objects and advantages of the invention will become more apparent during the course of the following description, when taken in connection with the accompanying drawings.

In the drawings wherein like numerals are employed to designate like parts throughout the same:

Figure 1:
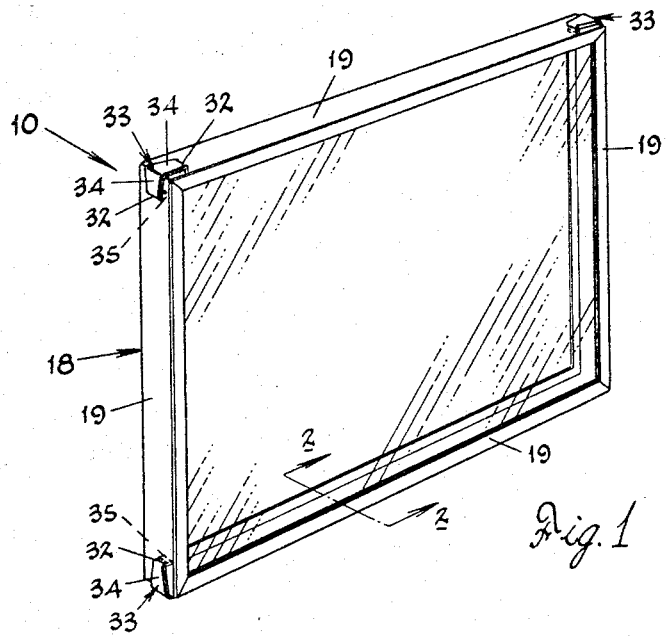
FIG. 1 is a perspective view of a multiple glass sheet glazing unit constructed in accordance with this invention.

With reference now to the drawings, there is disclosed a multiple glass sheet glazing unit designated in its entirety by the numeral 10 and comprising two sheets or plates of glass 11 and 12 arranged in spaced, face-to-face relation to provide an air space 13 therebetween. This air space is formed by the provision of suitable separator means such as a metal spacer strip 14 arranged entirely around the edges of the unit 10 and joined to the inner surfaces of the glass sheets 11 and 12 through the intermediary of metallic coatings 15 adherent to said sheets.

Figure 2:
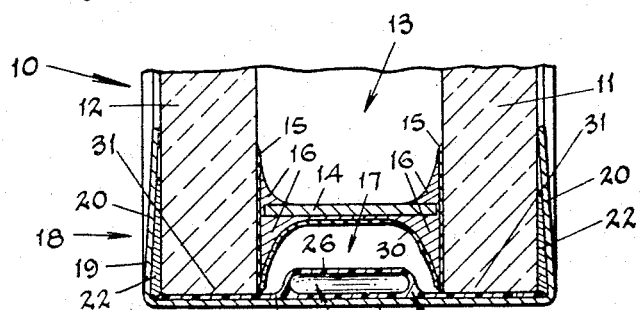
FIG. 2 is a vertical transverse sectional view taken on line 2—2 of FIG. 1.

Multiple glass sheet glazing units of this general character may be fabricated substantially in accordance with the practices set forth in the patent to C. D. Haven et al., No. 2,235,681, issued March 18, 1941. Briefly stated, the marginal portions of the two glass sheets are provided with tightly adherent metallic coatings 15 upon which is subsequently applied a layer of solder. A spacer strip 14, formed of lead, or a lead alloy, and suitably coated with a solder layer, is placed on the metallic coating 15 of one of the glass sheets inwardly of the edges thereof. A suitable heating means, such as a soldering iron, is then run along the juncture of the strip 14 and the metallic coating on the glass sheet to melt the solder layers and thus produce fillets 16 along the opposite sides of the strip. As the solder layers blend or amalgamate, the resulting fillets become permanently adherent to the spacer strip and the metallic coating on the glass sheet to establish a hermetic bond therebetween. The first glass sheet, such as the sheet 11, with the strip 14 united therewith, is then placed in an inverted position on a second glass sheet, such as the sheet 12, whereupon melting of the solder layers joins the spacer strip to the second glass sheet to provide a multiple glass sheet glazing unit. As shown in FIG. 2 the spacer strip 14 is positioned inwardly of the peripheral edges of the glass sheets to form a channel 17 extending entirely about the unit.

After the unit has been assembled, it is customary to insert hypodermic needles or the like through the strip 14 and into the space 13 to remove the air therefrom and to replace it with dehydrated air or a suitable inert gas; and to then close the openings with drops of solder. This is to eliminate as completely as possible any moisture from the sealed air space and to thereby maintain the inwardly disposed glass surfaces free from condensation.

In order to protect the edges and corners of the glass sheets 11 and 12 from accidental damage or breakage, a protective frame 18 is provided around the periphery of the glazing unit 10. This frame may be formed of a plurality of metal channel members 19 that are generally U-shaped with spaced leg portions 20 and a connecting base portion 21. Any suitable metal, such as stainless steel or aluminum, may be used to form the channel members 19. When the channel members are fitted about the edges of the unit 10, a layer 22 of a suitable adhesive material is preferably applied between the leg portions 20 and the outer surfaces of the glass sheets.

According to the present invention, means is provided ween the base portion 21 of the metal protective frame and the peripheral edges of the glass sheets 11 and to maintain the frame out of direct contact with the et edges as well as act as a cushioning layer so that )acts sustained by the frame will be absorbed thereby l which, if transmitted to the glass sheets, might cause nage thereto. Such means comprises a support member 23 in the form of a strip 24 of resilient material t is fitted about the periphery of the glazing unit and is equal in width to the thickness of the unit. : strip 24 is formed of a plastic material, prefer- y polyethylene, and comprises a base portion 25 which ers the edges of the glass sheets and acts as a resilient hioning layer between said edges and the metal ne 18.

'ormed integral with the inner surface of the base tion 25 of strip 24 are one or a plurality of spaced low elongated tubular portions 26 defining chambers containing air. These tubular portions are located ardly of the opposite edges of the base portion 25 are received within the channel 17 of the glazing t as shown in FIG. 2.

Figure 3:
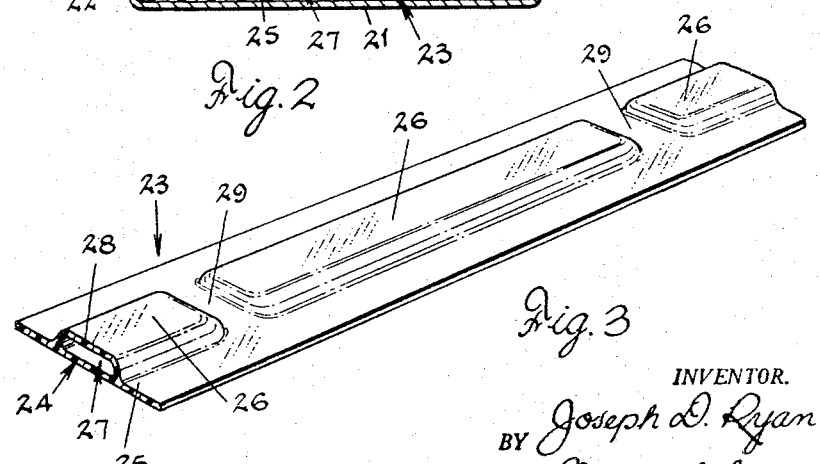
FIG. 3 is a fragmentary perspective view of the improved support member of this invention.

The purpose of the tubular portions 26 is to protect unit from extreme pressures that may be built up in channel 17 by the freezing of water which, in one / or another, may collect therein. This collection of er would be most apt to occur in the channel 17 at bottom of an installed unit and slightly upwardly ig the sides thereof and consequently, the pressure of frozen water may react to adversely affect or damage hermetic seal between the glass sheets and the sepa- )r means. Thus, the resilience of the hollow tubular tions 26 operates to absorb any pressures created in channel 17 by reason of ice formation therein, thereby 'ing to relieve the separator means from these pres- :s.

is pointed out above, the support member 23 is formed polyethylene which is particularly well adapted for purpose as it is not only resilient but also inert in presence of moisture and will not deteriorate in the during its expected period of use. The support mem- 23 could, if desired, be formed as a continuous tube the wall 28 thereof sealed to the base portion 25 )redetermined intervals, i.e. every two or three inches, indicated at 29 in FIG. 3, to form the individual :ontaining chambers 27.

'rior to placing the strip 24 and metal frame 18 ut the glazing unit, a high molecular weight organic /mer-microcrystalline wax coating composition is :erably spread over the metallic spacer 14 and the ler fillets 16 to form a moisture resistant film 30 that protect the metal from any moisture which may ect in the channel 17. Such a composition has been id to be highly desirable as a vapor barrier in that it :tively prevents moisture from coming in contact with metallic spacer strip 14 and metal fillets 16 and also eadily applied as it forms a homogeneous liquid on ing.

s viewed in FIG. 2, when the base portion 25 of the 'ethylene strip 24 is applied to the edges 31 of the s sheets, the hollow tubular portions 26 will be located ially therebetween in the channel 17. When the mel members 19 are placed about the perimeter of unit to form the frame 18, they are connected to one her at the corners of the unit by means of securing ibers adapted to connect the adjacent ends of the several members 19. As shown in FIG. 1, each of the channel members 19 is provided with a slot 32 in the base portion 21 thereof adjacent each end. Securing members or clips 33 having leg portions 34 arranged at substantial- ly right angles to one another, are fixedly retained in the slots 32 by means of the hooked ends 35 bent inwardly at the end of each leg. Thus, when the channel mem- bers are placed on a glazing unit as shown in FIG. 1, the hooked ends 35 of the clips 33 are inserted into the slots 32 thus firmly interconnecting the ends of the ad- joining channel members to form the protective frame 18.

Although there has been herein disclosed a multiple sheet glazing unit including a metal spacer strip secured to metallic coatings on the glass sheets it will be under- stood that this is merely illustrative and that the present invention is not limited to use in multiple sheet glazing units embodying the particular type of separator means herein illustrated and described.

It is also to be understood that the form of the inven- tion herewith shown and described is to be taken as a preferred embodiment of the same, but that various changes in the shape, size and arrangement of parts may be resorted to without departing from the spirit of the invention or the scope of the subjoined claims.

I claim:

1. A multiple glass sheet glazing unit, comprising a plurality of parallel sheets of glass spaced from one an- other, separator means positioned between the glass sheets adjacent to but inwardly of the peripheral edges thereof to maintain said sheets in spaced relation and to provide a channel surrounding the unit, a support member fitted about the periphery of the unit comprising a strip of inert resilient material opposite the peripheral edges of the glass sheets and enclosing said channel outwardly of said separ- ator means and means carried by said strip, having air contained therein, received in the channel to absorb any pressure built up by the freezing of moisture therein, and means securing the support member in place.

2. A multiple glass sheet glazing unit as defined in claim 1, wherein said last-named means comprises a chan- nel member fitting over the edge portions of the glass sheets.

3. A multiple glass sheet glazing unit as defined in claim 1, wherein the strip of inert resilient material has a width substantially equal to the thickness of the glazing unit, and the pressure absorbing means is formed integral- ly with said strip.

4. A multiple glass sheet glazing unit as defined in claim 3, wherein the pressure absorbing means comprises a hollow tubular portion, having air contained therein, extending along one surface of said strip.

5. A multiple glass sheet glazing unit as defined in claim 1, wherein the pressure absorbing means comprises a plurality of spaced elongated chambers, having air con- tained therein, extending along and integral with the inner surface of said strip.

6. A multiple glass sheet glazing unit as defined in claim 1, wherein the support member is formed of poly- ethylene plastic.

References Cited in the file of this patent
UNITED STATES PATENTS

| | | |
|---|---|---|
| 2,235,680 | Haren et al. | Mar. 18, 1941 |
| 2,684,266 | Englehart | July 20, 1954 |
| 2,925,633 | Morgan et al. | Feb. 23, 1960 |